Nov. 13, 1923.  
J. A. B. SMITH  
1,474,178  
TYPEWRITING MACHINE  
Filed Jan. 31, 1920  2 Sheets-Sheet 2
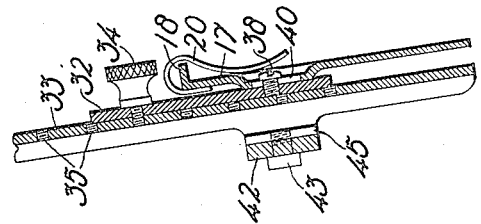
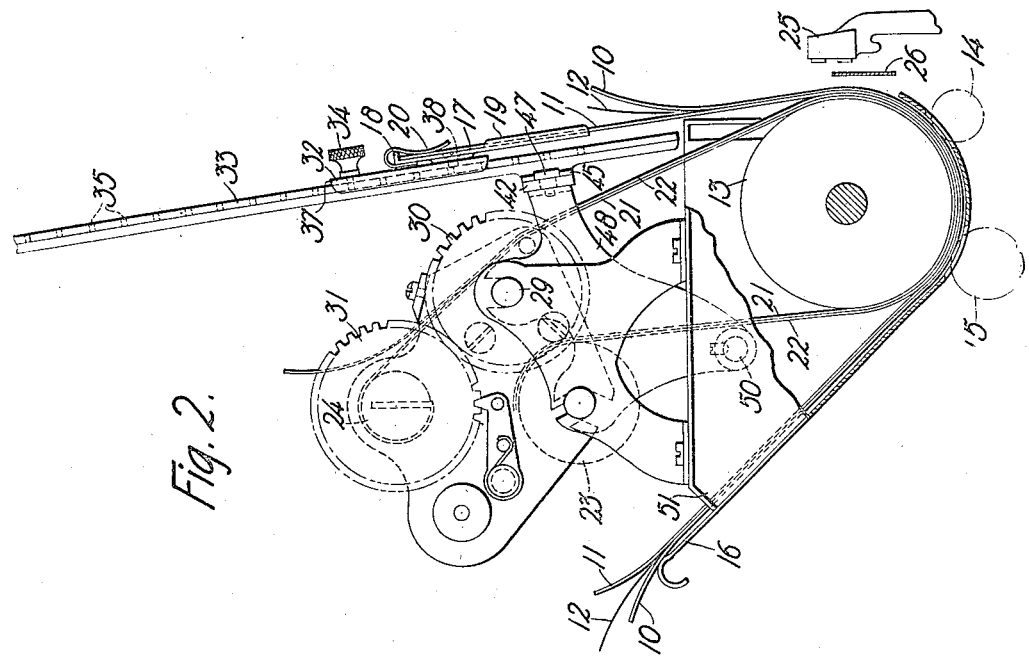
Inventor:  
Jesse A. B. Smith  
by D. B. Stickney  
Attorney Patented Nov. 13, 1923.

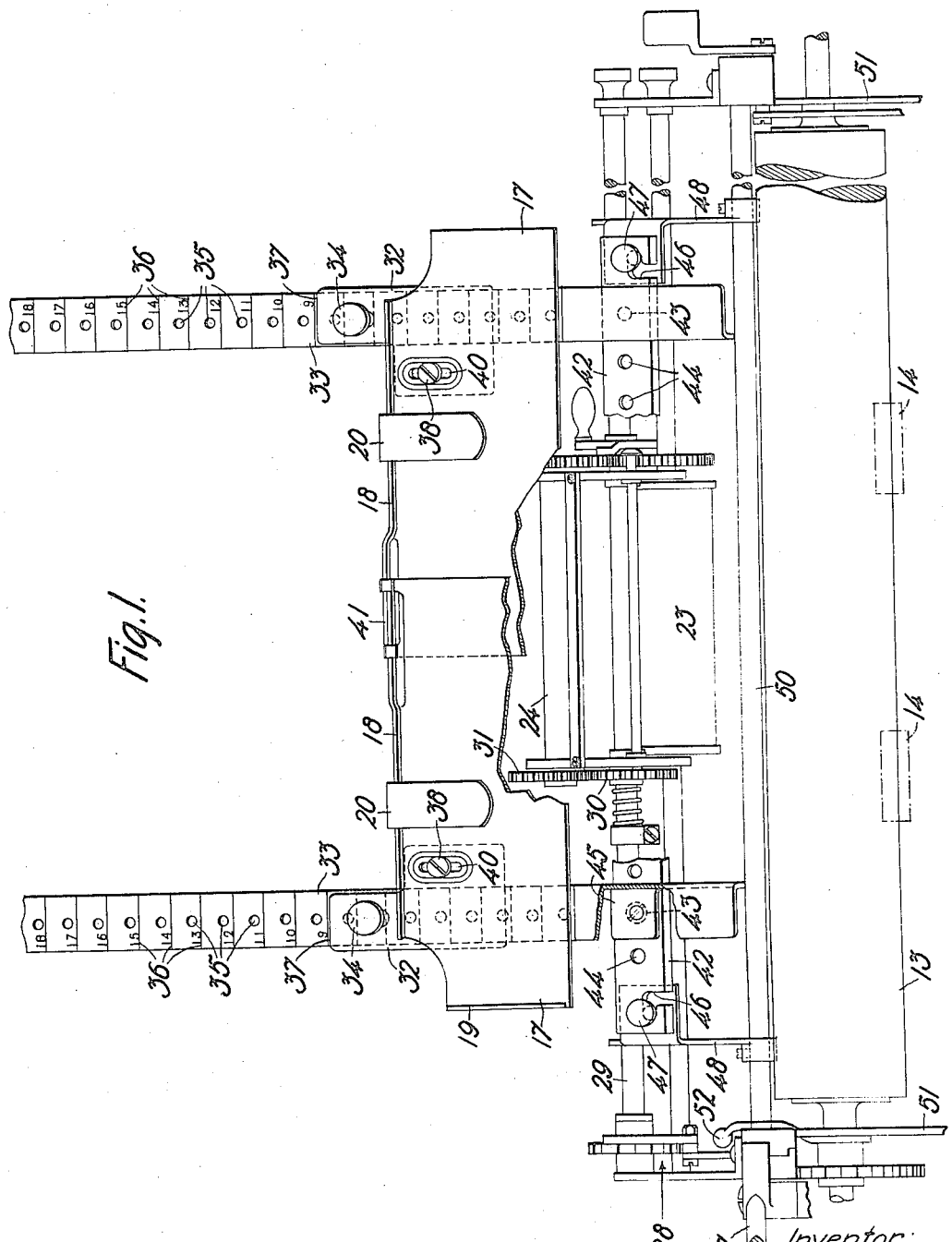

1,474,178

UNITED STATES PATENT OFFICE.

JESSE A. B. SMITH, OF STAMFORD, CONNECTICUT. ASSIGNOR TO UNDERWOOD TYPEWRITER COMPANY, OF NEW YORK, N. Y., A CORPORATION OF DELAWARE.

TYPEWRITING MACHINE.

Application filed January 31, 1920. Serial No. 355,334.

*To all whom it may concern:*

Be it known that I, JESSE A. B. SMITH, a citizen of the United States, residing in Stamford, in the county of Fairfield and State of Connecticut, have invented certain new and useful Improvements in Typewriting Machines, of which the following is a specification.

This invention relates to paper-controlling devices for typewriting machines.

An object of the invention is to produce a practicable device to guide the operator in inserting a sheet in the machine where a single line only is to be written upon the sheet. This is useful where a large number of sheets are reinserted in the machine periodically (daily, monthly or quarterly) for the insertion of new items thereon.

In carrying out this invention, a gage-table having a leading-edge gage may be provided for the leading edge of the sheet, and the gage-table may be made adjustable to a new position each period; so that it is only necessary for the operator to insert the sheet in the machine against the gage, to bring its writing position to the printing point. This arrangement also provides for accommodating bill-sheets having headings of various lengths. The gage may be provided with clips to hold the sheet.

One of the features of the invention is the provision of a gaging device comprising a gage and gage-table mounted upon a pair of upright bars, which may be inclined upwardly and rearwardly from the front of the platen, the bars being provided at linespace intervals with notches or holes, to receive screws, said screws passing through ears or mounts on the inclined bars, the holes being numbered to guide the operator in resetting the gaging device from period to period.

It will be seen that this feature involves the provision for locating and relocating the gage at mechanically-determined line-space intervals.

Another feature of the invention relates to side-gaging sheets which are inserted in this manner, and, for this purpose, the gage-table is provided, at one end, with a side-gage. The entire structure, comprising the gage-table and the upright bars, may be adjustable as a unit, lengthwise of the platen, so that the sheet may be located differently lengthwise of the platen.

The gage-table is preferably made in two telescoping parts, and the upstanding gage-bars may hence be separated more or less to change the length of the gage-table, thereby accommodating sheets of various widths; the table is telescoped in such a manner that the paper-clips for the leading edges of the sheets remain upon each of the telescopic sections, so as to be available for any width of sheet. The gage-table may be held upon its mounts by means of screws passing through slots, to permit adjustment of the gage upwardly and downwardly to square the gage to the platen, and to accommodate bills having headings of different depths, or to compensate for variations in the printing or ruling of the work-sheets, and in any case to bring the desired portion of the bill into position at the printing line.

By means of the present improvements, three sheets may be typed at the same time, a ledger-sheet, a bill-sheet and a record or tally-sheet; suitable mechanism being provided to feed the latter.

The gage-bars or side-bars may be carried by and adjustable along a horizontal bar overlying the platen. Said bar is detachably mounted on suitable brackets to permit the paper-guiding device to be removed, when it is desired to use the tally-sheet mechanism without the gage.

Other features and advantages will hereinafter appear.

In the accompanying drawings,

Figure 1 is a front view of part of an Underwood typewriter carriage, showing my invention applied thereto.

Figure 2 is a side view, partly in section, showing the parts as seen from the left-hand side of Figure 1.

Figure 3 is a detail sectional view, showing the gage-table secured to one of its mounts, the latter being secured to one of the upright bars.

Work-sheets 10 and 11, which may be a bill-sheet and a ledger-sheet, respectively, with a carbon 12 therebetween, may be inserted around a platen 13, after front and back feed-rolls 14 and 15 are cast off or thrown away from the platen in the usual manner by a finger-piece, not shown. The bill-sheet 10 and ledger-sheet 11 may be inserted from the back of the platen and over a paper-table 16, and pushed around past the printing point over a gage-table 17, having at its upper end a gage 18 against which the leading edge of the ledger-sheet may be pushed to position it relatively to the printing point and align it relatively thereto, so that the writing line may be parallel with the leading edge. A side gage 19 on the gage-table 17 may be provided to assist in positioning the ledger-sheet endwise of the platen.

The ledger-sheet may be held in its gaged position by spring clips 20, secured to said gage, while the bill-sheet 10 may be adjusted relatively thereto to bring the writing position of the latter to the printing point and into register with the writing position of the ledger-sheet 11. To assist in registering the bill-sheet 10 with the ledger-sheet 11, the bill-sheet and the ledger-sheet may be provided with suitable indices thereon, at line-space positions thereof, as is well known in the art.

A proof-sheet or tally-sheet 21 may be fed with a carbon 22 down from a supply roll 23, around the platen 13 and up in front thereof, passing below and at the back of the aligning plate or paper-table 17 to a receiving roll 24, so that a record of the entries on the various bills and ledger-sheets may be had.

After the ledger-sheet 11 and bill-sheet 10 have been positioned, the feed-rolls 14 and 15 may be thrown on, thus serving as means to hold the bill-sheet 10 against displacement while the periodical entry is being made by operatng the type-bars 25; the type impressions on the bill-sheet 10 being made through the usual ribbon 26, while the impressions on the ledger-sheet 11 and the proof-sheet 21 are made through the carbons 12 and 22, respectively.

After the entry has been typed, the usual line-spacing mechanism, including a handle 27, may be operated to advance the tally-sheet 21 to the next printing position. For this purpose, there may be provided a pawl-and-ratchet connection 28 between the line-space mechanism and a driving shaft 29 to operate the latter; said shaft having a gear 30 thereon meshing with a gear 31 on the receiving roll 24 to wind up the tally-sheet 21 on said roll. The tally-sheet-feeding mechanism may be like that disclosed in the patent to F. A. Hart, No. 1,281,160, of October 8, 1918. The feeding of the tally-sheet 21 may be done while the ledger-sheet 11 is still in the machine. The feed-rolls 14 and 15 may then be released to permit the bill-sheet and ledger-sheet to be removed from the platen at the front thereof, prior to inserting the succeeding bill and ledger sheet around the platen. The gage-table 17 may be adjustable or settable to positions corresponding to daily, monthly or quarterly periods, so that the gage 18 may position the ledger-sheets of various kinds upon which daily, monthly and quarterly entries may be made. For this purpose, the gaging device, comprising the gage-table 17 and gage 18, is carried by mounts or slides 32, adjustably secured to upright gage-carrying bars 33 by fastening devices, herein shown as screws 34 threaded into equally-spaced holes 35 in said gage-carrying bars. The gage-carrying bars 33 may be provided with indices or graduations 36, which may have numerals corresponding to the various periods of entry. In the construction shown in the drawings, the screw-holes 35 are spaced apart usual double line-space distances so that the gage-table 17 and leading-edge gage 18 are settable by mechanically-determined stages or intervals to occupy a series of different positions relatively to the printing line on the platen, corresponding to the respective minor business periods, for typing a single line for each such position upon each of a series of separately inserted work-sheets, as hereinbefore stated. In the embodiment of the invention illustrated in the drawings, the numbered indices 36 represent the respective business days of a month, to provide for making a single entry of a single line for each of the respective business days in the month. In this way, each business day is a minor business period and a full business month is a major business period. To position the gage 18, the upper edges 37 of the mounts 32 may be moved to the graduations, thus bringing the screws 34 into register with the holes 35 to secure the gaging device in position. For example, if it is desired to make an entry in the position corresponding to the ninth period, the gaging device is moved until the upper edges 37 of the mounts 32 register with the indices marked "9"; the screws are then run into the holes to firmly secure the mounts and consequently the gage in position for the entries to be made in the ninth period.

Also, for some classes of work, as hereinafter more fully described, the above described adjustability to different working positions of the mounts 32 on the uprights 33 may be employed to accommodate statements or bill-sheets having headings of various lengths.

The ledger-sheets are usually ruled, and the distance from the leading edge to the position of the first writing line may differ slightly in various kinds of ledger-sheets. To compensate for such variations, the gage-table 17 is adjustably mounted on the mounts 32 by screws 38 passing through elongated slots 40 in said gage-table, so that the position of the latter may be varied slightly to always bring the writing line to the printing point, when the leading edge of the ledger-sheet engages the gage. Also, this arrangement enables the gage-table 17, together with the leading-edge gage 18 and sheet-holding clips 20 carried thereby, to be trued up relatively to the printing line.

To adjust the gage to accommodate ledger-sheets of various widths it may be telescopic, as indicated at 41, and the gage-supporting bars 33 may be adjustable on a cross-bar 42, on which they may be held by fastening devices, herein shown as screws 43 passing through holes 44 in said bar; said screws being threaded into ears 45 on said gage-carrying bars.

The gage-table or collating table 17 may also be adjusted as a whole lengthwise of the bar 42 to position the work-sheet differently lengthwise of the platen.

The aligning device as a whole, comprising the gage-table 17, the gage 18, the gage-carrying bars 33 and the cross-bar 42, may be readily attached to or removed from the machine. For this purpose, the cross-bar 42 is provided at its ends with L-shaped slots 46 to fit over headed studs 47 of brackets 48 secured to a rod 50 between the end plates 51 of a platen-supporting frame the L-shaped slots 46 being turned in opposite directions and the brackets 48 being sufficiently resilient to permit the studs 47 to be sprung into the slots 46. Thus it will be seen that if it should be desired to use the tally-sheet device for a class of work where the aligning device is not needed, the latter may be readily removed from the machine.

It should be understood that the indices of the gage-carrying bars 33 may correspond to single, double or treble line-spaces, and that the line-space movements of the platen may be varied accordingly by the usual line-space control-handle 52, said handle being herein shown as set for double line-spacing.

Further, it should be understood that, although the device is shown and described in connection with the usual Underwood carriage in which the work-sheets are inserted around the back of the platen, the device may be used to an equal advantage in connection with a carriage which permits work-sheets to be inserted from the front of the platen, such as shown in my co-pending application No. 347,473 filed December 26, 1919.

Also, it is to be understood that the means for locating and relocating the mounts 32, comprising the screws 34 and the screw-receiving holes 35 in the uprights 33, provides for changing or adjusting the working position of the gage-table 17, together with the leading-edge gage 18 and sheet-holding clips 20, so that these parts may occupy a plurality of working positions at different heights relatively to the printing line, as indicated by the indices 36, for thereby accommodating work-sheets or bill-sheets having headings of various lengths. Such adjustment for this purpose will be found particularly useful in the case of front-inserted work-sheets, such as above noted, but may also be used for accommodating headings of various lengths in the case of work-sheets inserted from the rear around beneath the platen 13.

Variations may be resorted to within the scope of the invention, and portions of the improvements may be used without others.

Having thus described my invention, I claim:

1. In a typewriting machine, the combination with a platen, of a sheet-gaging device comprising a leading-edge gage to position a work-sheet relatively to said platen, a support on which the sheet-gaging device is adjustable, means for mechanically determining line-space positions of the gaging device on the support and for positively retaining the device in such positions against accidental misplacement, comprising holes spaced apart at equal single line-space distances and extending in rows away from the printing line, and screws carried by and movable with said gage, which may be fitted closely into any of said holes with reference to which the gaging device has been properly positioned.

2. In a typewriting machine, the combination with a cylindrical platen, of a table at the delivery side of said platen, said table having a leading-edge gage at the upper edge thereof, a support on which the table is adjustable, said support being provided with screw holes spaced apart at equal distances and extending away from the printing line, a clip on said table to hold a work-sheet thereon against said leading-edge gage, and means for securing said table in mechanically-determined line-space positions on said support, comprising screws, carried by and movable with said table, which may be screwed into any of said screw holes with reference to which the gage has been properly positioned.

3. In a typewriting machine, the combination with a platen, of a sheet-gaging device comprising a leading-edge gage to position a work-sheet relatively to said platen, a fixed support for said gaging device, slides upon which said gaging device is mounted means to facilitate an adjustment of said gaging device relatively to said slides, and means connecting said slides to said support to adjust said slides and gaging device towards and away from the printing point through a wide enough range to enable the leading-edge gage to gage and align the work-sheet with any desired writing line from the top to the bottom of the sheet at the printing point.

4. In a typewriting machine, the combination with a cylindrical platen, of a gaging device to position a work-sheet relatively to the printing point, two bars extending upwardly from said platen, mounts adjustably secured to said bars, said gaging device being secured to said mounts, and means to locate said mounts at numerous line-space positions upon said bars.

5. In a typewriting machine, the combination with a platen, of two gage-carrying bars at the ends of the platen, a gage-table having a leading-edge gage adjustable relatively to said gage-carrying bars, and of a length to true the sheet relatively to the printing line, indices on said gage-carrying bars to locate said gage relatively to the bars, means to secure said gage-table in adjusted position on said bars, and means at said leading-edge gage to clip the work-sheet in its gaged position preparatory to typing thereon.

6. In a typewriting machine, the combination with a platen, of a platen-frame, a gage-table, a support upon which said gage-table is adjustably mounted, brackets on said platen-frame to carry said support, and pin-and-bent-slot connections detachably connecting said brackets to said support, said brackets being resilient to permit the support to be readily attached to said brackets.

7. In a typewriting machine, the combination with a platen supported in a platen-frame, of a gaging device comprising a leading-edge gage to position a work-sheet relatively to said platen, two gage-carrying bars upon which said gaging device is adjustably mounted, said gaging device, including the gage, being made in two telescoping sections, and a cross-bar mounted on the platen-frame, said gage-carrying bars being adjustable toward and away from each other on said cross-bar.

8. In typewriting machine, the combination with a platen, of a platen-frame, a gage-table to adjust a work-sheet around said platen relatively to the printing point, a side gage on said gage-table, two upright bars having holes therein, holding devices on said gage-table to be received in the holes to facilitate an adjustment of said gage-table up and down relatively to the printing point, a cross-bar having holes therein, said cross-bar being supported on said platen-frame, and holding devices to be inserted in the holes of said cross-bar, and connected to the upright bars to hold them in place on said cross-bar, the holes in said cross-bar permitting endwise adjustment of the gage-table with the side gage relatively to the platen.

9. In a front-strike typewriting machine, the combination with a platen, of means for locating and truing a work-sheet relatively to the printing line, comprising a gage-table having a leading-edge gage at the delivery side of the platen above the printing line and about co-extensive with the platen, a pair of upright bars at the ends of the platen upon which said gage-table is mounted, and means for securing said gage-table to locate the leading-edge gage mechanically in predetermined line-space positions on said upright bars.

10. In a front-strike typewriting machine, the combination with a platen, of a pair of upright bars at the delivery side of the platen, a sheet-gaging device, comprising a leading-edge gage, mounted on said bars, means for locating and detaining said sheet-gaging device at any one of a series of mechanically-determined spaced positions relatively to the printing line, to gage a work-sheet with any writing line thereof from the top to the bottom of the sheet at the printing point, and means for holding the work-sheet on said sheet-gaging device in any of the positions of the latter.

11. In a front-strike typewriting machine for typing entries periodically upon each of a large number of forms, each form having an identical series of numerous chronological divisions identically located and arranged in succession substantially all the way from the top to the bottom of the sheet, a rotary platen, a sheet-gaging device at the delivery side of the platen comprising a leading-edge gage settable periodically to locate every one of the forms as it is inserted with a selected chronological division in position to receive an entry, and means for mechanically determining and securing positively the correct periodic setting of said gaging device for locating any chronological division of the forms from the top to the bottom thereof in writing position.

12. In a front-strike typewriting machine for typing entries periodically upon each of a large number of forms, each form having an identical series of numerous chronological divisions identically located and arranged in succession substantially all the way from the top to the bottom of the sheet, a rotary platen, a sheet-gaging device at the delivery side of the platen comprising a leading-edge gage, a pair of mounts on which the gaging device is mounted with capacity for adjustment to true it with reference to the line of writing, a pair of upright bars, co-operating means upon the mounts and the bars to determine numerous periodic settings of the gaging device covering a wide enough range to enable the gaging device to locate a form with any chronological division from the top to the bottom thereof in position to receive an entry, and means on the gaging device for holding the form against the gage in any position to which the gaging device may be adjusted.

13. In a front-strike typewriting machine for typing entries periodically upon each of a large number of forms, each form having an identical series of numerous chronological divisions identically located and arranged in succession substantially all the way from the top to the bottom of the sheet, a rotary platen, a pair of gage-supporting upright bars at the delivery side of the platen, a gage-carrying mount for each of the bars, means for mechanically locating and detaining each of said mounts at any one of a series of equally spaced positions relatively to the printing line, and a gaging device comprising a leading-edge gage adjustable upon said mounts relatively to the printing line, the range of the positions occupied by the mounts being wide enough to allow the leading-edge gage to locate any chronological division of a form at the printing line.

14. In a front-strike typewriting machine for typing entries periodically upon each of a large number of forms, each form having an identical series of numerous chronological divisions identically located and arranged in succession substantially all the way from the top to the bottom of the sheet, a rotary platen, a pair of gage-supporting upright bars at the delivery side of the platen, a gage-carrying mount for each of the bars, means for locating and detaining each of said mounts at any one of a series of mechanically-determined spaced positions relatively to the printing line, a sheet-gaging device adjustable on said mounts relatively to the printing line comprising a gage-table and a leading-edge gage, the range of positions occupied by said device being wide enough to enable the leading-edge gage to locate any chronological division of a form at the printing line, and means associated with said leading-edge gage and gage-table for holding a work-sheet against said gage in any position of the latter.

15. In a front-strike typewriting machine for typing entries periodically upon each of a large number of forms, each form having an identical series of numerous chronological divisions identically located and arranged in succession substantially all the way from the top to the bottom of the sheet, a rotary platen, a pair of table-supporting upright bars at the delivery side of the platen, a table-carrying mount for each of said bars, means for locating and detaining each of said mounts at any one of a series of mechanically-determined spaced positions relatively to the printing line, and a gage-table having a leading-edge gage, adjustable with said mounts and also relatively to said mounts, the adjustment of the mounts enabling the leading-edge gage to locate a form with any one of its chronological divisions at the printing line.

16. In a front-strike typewriting machine, the combination with a cylindrical platen, of a pair of independently adjustable upright bars at the delivery side of the platen, means for adjustably securing said upright bars at different positions longitudinally of the platen, separate mounts adjustable with said bars and adjustable along said bars toward and from the platen, and a gage-table adjustable as to width secured upon said mounts.

17. In a front-strike typewriting machine, the combination with a cylindrical platen, of a pair of upright bars at the delivery side of the platen, means for adjustably securing said upright bars at different positions longitudinally of the platen, mounts adjustable along said bars, and a gage-table secured to said mounts, said gage-table being extensible so that, by varying the distance between said upright bars, the table may be adjusted for different widths of work-sheets.

18. In a front-strike typewriting machine, the combination with a cylindrical platen, of a pair of upright bars at the delivery side of the platen adjustable longitudinally of the platen, means for mechanically locating and detaining said upright bars at predetermined intervals longitudinally of the platen, mounts adjustable along said bars, and a gage-table secured to said mounts.

19. In a front-strike typewriting machine, the combination with a cylindrical platen, of a pair of upright bars at the delivery side of the platen, mounts connectible at intervals along said bars, a gage-table secured to said mounts and having a side-edge gage, and means for fastening said upright bars at different adjusted positions longitudinally of said platen, whereby the position of said side-edge gage longitudinally of the platen may be variably fixed.

20. In a front-strike typewriting machine, the combination with a cylindrical platen, of a table at the delivery side of the platen, said table being provided with a leading-edge gage and a side gage, a support for said table, and means for locating and detaining said table on said support at mechanically-determined line-space intervals throughout a sufficiently wide range to enable the leading-edge gage to locate an inserted sheet with any desired line from the top to the bottom thereof at the printing point.

21. In a typewriting machine, the combination with a platen, of a sheet-gaging device comprising a leading-edge gage to position a work-sheet relatively to said platen, a support on which the sheet-gaging device is adjustable towards and away from the printing line, and means for mechanically locating and truing said gaging device upon said support, said means comprising two rows of correspondingly numbered holes in said support, said holes sufficiently numerous to afford a new position for said gaging device for every business day of the month, said rows extending away from the printing line, and two projections upon the gaging device, one projection for one row of holes and the other projection for the other row of holes, said projections fitting closely in said holes so as to true the gage relatively to the printing line, the holes being equally spaced at single line-space intervals in each row, and so positioned and indexed with relation to each other that the gage may be brought quickly into parallelism with the platen by insertion of one projection into a hole in one row and the other projection into the correspondingly indexed hole in the other row.

22. In a typewriting machine, the combination with a platen, of a leading-edge gage to position a work-sheet relatively to said platen, a support on which the gage is adjustable towards and away from the printing line, and means for mechanically locating and truing said gage upon said support, said means comprising a row of numbered holes in said support, said holes sufficiently numerous to afford a new position for said gage for every business day of the month, said row extending away from the printing line, and a projection upon the gage to fit closely in said perforations or holes, the holes being equally spaced at single line-space intervals, and also comprising means to co-operate with said holes and projection for bringing the gage into parallelism with the platen at its various positions of adjustment along said row.

23. In a front-strike typewriting machine, a rotary platen, a pair of light upright bars extending upward at the delivery side of the platen, and a short gage-table having a leading-edge gage extending between said bars, the gage-table being short enough to gage a work-sheet with a writing line near the top of the sheet at the printing point, and means for adjusting the gage-table toward and from the platen through a range exceeding the height of the gage-table to various gaging positions, the upright bars and gage-table combining to form a light adjustable collating frame.

24. In a front-strike typewriting machine, a rotary platen and a light skeleton collating frame at the delivery side of the platen, comprising a pair of upright bars and a short gage-table having a leading-edge gage adjustable toward and from the platen along the bars to gage an inserted sheet in any selected writing-line position from the top to the bottom of said sheet, the gage-table being adjustable to vary its width, and means for adjusting the upright bars toward and from each other to change the width of the collating frame.

JESSE A. B. SMITH.

Witnesses:
 JENNIE P. THORNE,
 EDITH B. LIBBEY.